(12) United States Patent
Jiang et al.

(10) Patent No.: US 8,737,791 B2
(45) Date of Patent: May 27, 2014

(54) DMD PERFORMANCE IN BEND OPTIMIZED MULTIMODE FIBER

(75) Inventors: Xinli Jiang, Shrewsbruy, MA (US); Jinkee Kim, Norcross, GA (US); George Oulundsen, Belchertown, MA (US); Yi Sun, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 136 days.

(21) Appl. No.: 13/023,938

(22) Filed: Feb. 9, 2011

(65) Prior Publication Data

US 2011/0194827 A1  Aug. 11, 2011

Related U.S. Application Data

(60) Provisional application No. 61/302,696, filed on Feb. 9, 2010, provisional application No. 61/306,607, filed on Feb. 22, 2010.

(51) Int. Cl.
*G02B 6/02* (2006.01)
*G02B 6/028* (2006.01)
*G02B 6/036* (2006.01)

(52) U.S. Cl.
CPC .......... *G02B 6/0281* (2013.01); *G02B 6/02042* (2013.01); *G02B 6/028* (2013.01); *G02B 6/0288* (2013.01); *G02B 6/03616* (2013.01); *G02B 6/03638* (2013.01)

USPC .......... 385/124; 385/123; 385/126; 385/127; 385/128

(58) Field of Classification Search
CPC .......................... G02B 6/0281; G02B 6/03638
USPC .......................................... 385/124
See application file for complete search history.

(56) References Cited

U.S. PATENT DOCUMENTS

| | | | | |
|---|---|---|---|---|
| 4,852,968 | A  * | 8/1989 | Reed | 385/127 |
| 6,078,715 | A  * | 6/2000 | Fujii et al. | 385/124 |
| 6,266,467 | B1 * | 7/2001 | Kato et al. | 385/123 |
| 6,280,850 | B1 * | 8/2001 | Oh et al. | 428/428 |
| 6,530,244 | B1 * | 3/2003 | Oh et al. | 65/417 |
| 2004/0228593 | A1* | 11/2004 | Sun et al. | 385/127 |
| 2011/0088433 | A1* | 4/2011 | Allegretto et al. | 65/378 |
| 2011/0123162 | A1 | 5/2011 | Molin | |
| 2011/0135262 | A1 | 6/2011 | Molin | |

FOREIGN PATENT DOCUMENTS

JP          4684593       5/2011

* cited by examiner

*Primary Examiner* — Ryan Lepisto
(74) *Attorney, Agent, or Firm* — Law Office of Peter V. D. Wilde

(57) ABSTRACT

Optical fiber refractive index profile designs having an alpha core profile and a negative index trench to control bend loss, are modified by truncating the edge of the alpha core profile and adding a ledge to the truncated core. The result is low bend loss and preservation of low differential mode delay and high bandwidth.

12 Claims, 7 Drawing Sheets

DMD PERFORMANCE IN BEND OPTIMIZED MULTIMODE FIBER

RELATED APPLICATIONS

This application claims priority from U.S. Provisional Application No. 61/302,696 filed Feb. 9, 2010, and U.S. Provisional Application No. 61/306,607 filed Feb. 22, 2010, which applications are incorporated by reference herein in their entirety. It is also related to U.S. patent application Ser. No. 12/583,212, filed Aug. 17, 2009, and U.S. patent application Ser. No. 12/658,804, filed Feb. 16, 2010, which patent applications are incorporated by reference herein in their entirety.

FIELD OF THE INVENTION

The invention described and claimed in this application relates to multimode optical fibers designed for exceptional bend loss and modal dispersion characteristics.

BACKGROUND OF THE INVENTION

The tendency of optical fibers to leak optical energy when bent has been known since the infancy of the technology. It is well known that light follows a straight path but can be guided to some extent by providing a path, even a curved path, of high refractive index material surrounded by material of lower refractive index. However, in practice that principle is limited, and optical fibers often have bends with a curvature that exceeds the ability of the light guide to contain all the light.

Controlling transmission characteristics when bent is an issue in nearly every practical optical fiber design. The initial approach, and still a common approach, is to prevent or minimize physical bends in the optical fiber. While this can be largely achieved in long hauls by designing a robust cable, or in shorter hauls by installing the optical fibers in microducts, in all cases the optical fiber must be terminated at each end. Thus even under the most favorable conditions, certain bending, is encountered at the optical fiber terminals.

Controlling bend loss can also be addressed by the physical design of the optical fiber itself. Thus, ring features or trench features, or combinations thereof, to control bend loss are commonly found at the edge of the optical fiber refractive index profiles. See for example, U.S. Pat. Nos. 4,691,990 and 4,852,968, and U.S. patent application Ser. No. 12/583,212, filed Aug. 17, 2009, all incorporated herein by reference.

In a conventional graded index multimode fiber, high order modes suffer greater loss than low order modes when the fiber is bent. In bend-optimized multimode fiber designs (BOMMF), a trench is located at the outer edge of the graded index core to minimize the bend loss of high order modes. As is well known in this art, a trench refers to an annular region of depressed index located in, and part of, the cladding region.

A problem associated with BOMMF designs is that, while the trench reduces the bend loss of high order modes, it also changes significantly the propagation properties of high order modes. Dependent on the space between core and trench in the BOMMF designs, higher order modes travel either faster or slower than other modes. Thus the modal dispersion of higher order modes may be seriously distorted because of the unequal effect of the trench on the velocity of the propagating modes. This modal dispersion is often characterized by Differential Mode Delay (DMD) measurement. The challenge in the design of BOMMF with a trench is to maintain good bend loss performance while controlling the DMD of the high order modes. Ideally, an optical fiber has good bend loss performance and good DMD performance at the same time. In addition, the process to make such fibers should be robust and easy to control.

In typical optical fiber designs in which a trench is used to aid in controlling bend loss the trench is spaced from the edge of the alpha profile of the core by a shoulder. Typically the shoulder is silica with a refractive index of 1.456, but could be doped silica and have either a higher refractive index (positive delta n) or a lower refractive index (negative delta n) than silica. The width of the shoulder can be a design variable used in combination with other design parameters to modify fiber characteristics. An additional tool used to control DMD and bend loss performance is to truncate the edge of the core.

STATEMENT OF THE INVENTION

We have discovered that good control of the DMD in a BOMMF with a slightly truncated core spaced from a trench by a shoulder results and even better control of the DMD results when a ledge is added to the shoulder.

DETAILED DESCRIPTION

Figure 1:
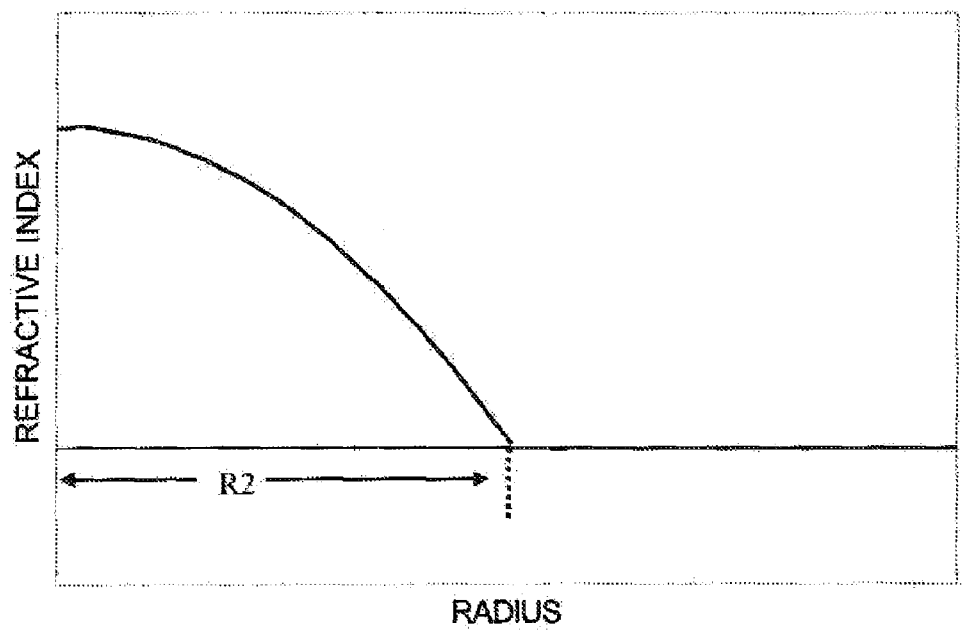
FIG. 1 is a plot showing a refractive index profile for a standard multimode optical fiber.

Bend loss occurs in both single mode and multimode optical fibers. Multimode optical fibers are typically used in communications over short distances such as in data centers, enterprise LAN, SAN, etc. The advantage of multimode fiber lies partly in the ability to couple this fiber with simple and cost effective sources. In the past these sources were mainly LEDs with a wavelength around 850 or 1300 nm. In the last decade, low cost Vertical Cavity Surface Emitting Laser (VCSEL) laser diodes with vertical resonators have become commercially widespread. These lasers enable effective coupling between the laser diode and optical fibers and also are capable of very high modulation rates, e.g., up to 10.3125 Gbps.

Performance issues for optical fibers under bent conditions have generally been considered to involve general optical power loss due to leakage of light from the optical fiber at the location of the bend. The influence of modal structure changes upon bending a fiber is generally overlooked.

In single mode optical fibers general power loss is the primary consideration, since all leakage involves light in the fundamental mode of the optical fiber. However, in multimode optical fiber the modal structure affects the bend loss, with higher order modes suffering more loss than lower order modes. The combination of higher order and lower order modes in a multimode optical fiber determines the bandwidth, and thus the signal carrying capacity of the optical fiber.

For high bandwidth, the group velocities of the various modes in multi-mode fibers should be as close to equal as possible. The differential group velocities can be controlled by grading the refractive index of the material comprising the core, which means specifying a functional form of the index as a function of the fiber radius. In a conventional multi-mode fiber, the design goal has been to achieve a shape defined by:

$$n(r)=[n_1^2-(n_1^2-n_{clad}^2)(r/R2)^\alpha]^{1/2} \quad (1)$$

where r is the radius of the fiber, n1 is the refractive index at the center of core, R2 is the radius of the core, $n_{clad}$ is the refractive index of the cladding, and α is free parameter. This is the so-called ideal α-shape (alpha core) profile, where α has a value typically of 1.7 to 2.2. In a conventional optical fiber profile the alpha core extends radially out to the point where the power law curve intersects $n_{dad}$ which in a typical MMF design has a delta of zero (index of pure silica), but not necessarily.

An inherent limitation of the alpha core profile design is that high order modes are not properly compensated due to the abrupt change in refractive index at the core-clad boundary and coupling to cladding modes at the edge of the core. Thus, the modal delay of high order modes deviates from low order and medium order modes. In conventional MMF, tuning of the profile can mitigate most or all of the modal delay difference between modes.

However, in bend insensitive MMF, the interaction of the higher order modes with the trench makes it much more challenging to equalize all the modal delays. Thus, improved methods of equalizing modal delay of high order modes are needed for bend insensitive MMF (BIMMF) used in high speed digital transmission. In the current state of the art, high speed transmission for optical data systems is generally considered to be 10 Gb/s or greater.

Figure 2:
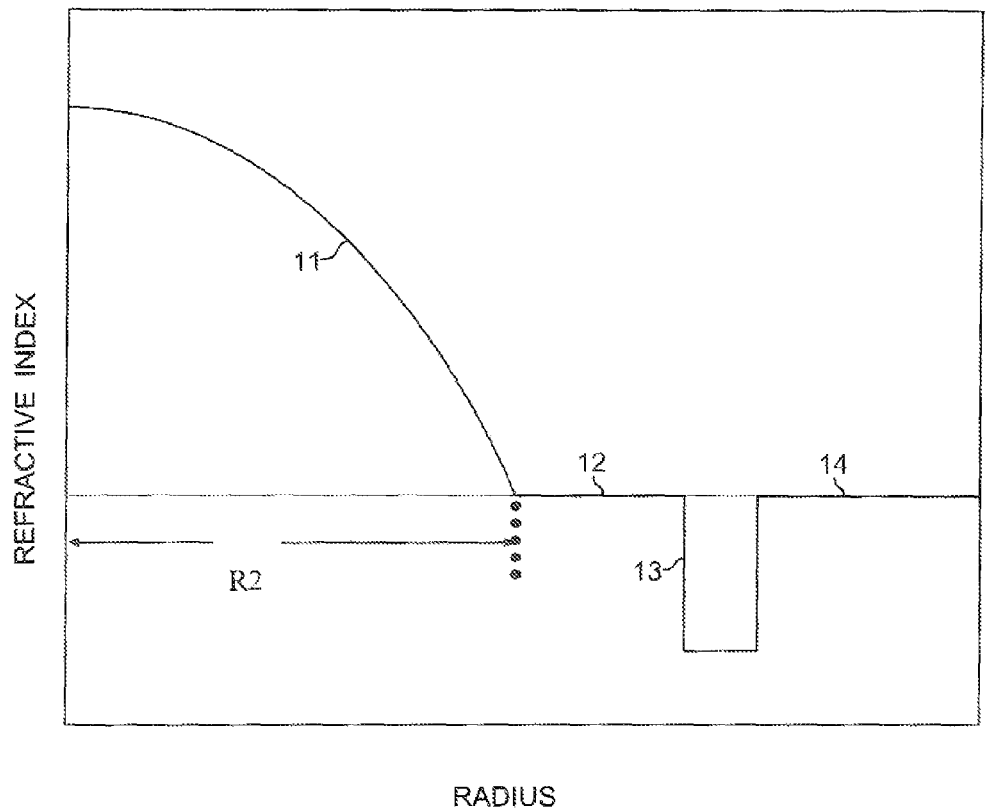
FIG. 2 is a plot showing a refractive index profile for a typical bend insensitive multimode optical fiber.

Improvement in bend loss characteristics may be achieved by adding a trench to the refractive index profile. A trench is a down doped region, typically a fluorine doped silica region, having a lower refractive index (negative delta n) than pure silica. FIG. 2 shows a refractive index profile for a MMF having an alpha core 11 extending to R1, with a trench 13 added to the outer cladding 14 to reduce bending loss. Between the trench and the alpha core is a shoulder 12. For reference, FIG. 1 shows a typical refractive index profile for a standard conventional MMF without a trench.

The interaction of the higher order modes with the shoulder and trench make it even more difficult to tune the fiber profile and equalize all the modal delays. It is recognized that it is important to locate the trench properly to achieve a combination of reduced differential mode delay and improved bend loss characteristics. It is known that the width of the shoulder 12 in the design of FIG. 2 affects not only the bend loss but mode propagation characteristics of the optical fiber.

However, due to other considerations, e.g., difficulty for alternative manufacture technology to produce narrow shoulder, process capability to control shoulder width precisely to achieve perfect DMD, compatibility of optical fibers having the narrow shoulder design with optical fibers made by different manufacturing techniques, and compatibility with other optical fibers to which optical fibers with the narrow shoulder design may be spliced, it is desirable to extend the shoulder width beyond what has been commonly used. We have found that if the shoulder is significantly extended, for example, beyond 4 microns, the higher order modes propagate faster than the lower order modes, thus impairing the bandwidth performance of the optical fiber.

Figure 3:
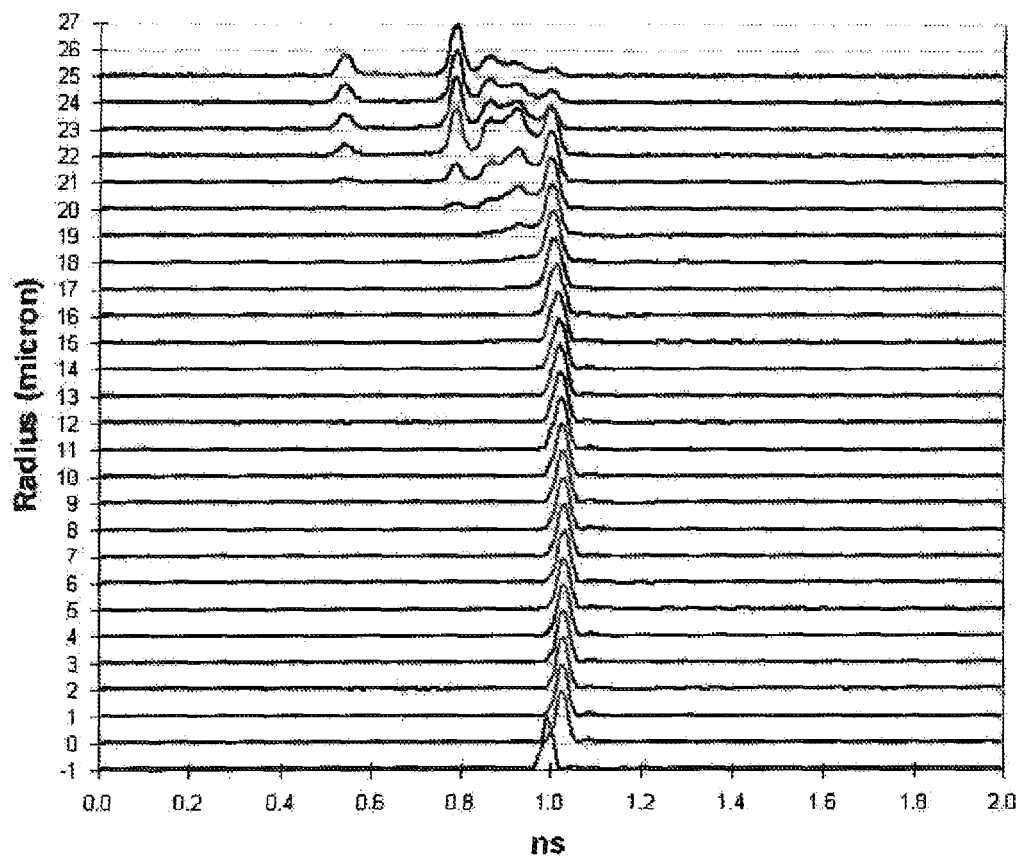
FIG. 3 is a Differential Mode Delay (DMD) trace for the optical fiber of FIG. 1 showing modal delay from 0~25 micron radius position.
Figure 4:
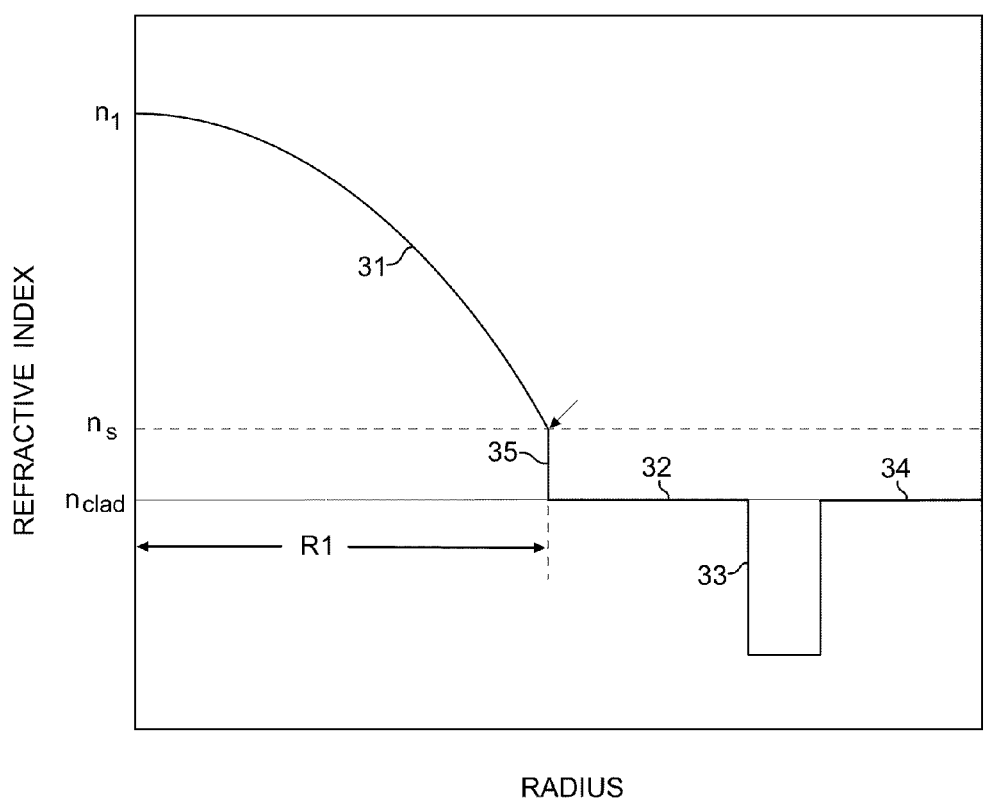
FIG. 4 shows a refractive index profile, according to one aspect of the invention, for an optical fiber having a truncated core.

This effect is illustrated in FIG. 3, which is a DMD plot for an optical fiber with a shoulder width of 8.5 microns, much larger than widths used in previous typical designs. The plot has temporal mode position at scan radius from 0-25 um, and shows how the higher order modes, as shown at radius 19-25 um in FIG. 2, propagate faster than the other modes, leading to modal dispersion and reduced bandwidth. According to the invention a solution to the DMD impairment just described involves adding a truncated edge to the alpha core shown in FIG. 2. A refractive index profile for this modified design is shown in FIG. 4, where features 32, 33, and 34, i.e. the shoulder, trench and outer cladding, are similar to those shown in FIG. 2. The core is modified by truncating the core region with radius position greater than R1, resulting in an index step 35 between the edge of the core and inner cladding.

The parameters used to define the truncated core are given in FIG. 4. R1 is the physical core radius, i.e., the point where the core is truncated. Refractive index delta n is the departure of the refractive index from that of pure silica. It will be understood that this reference point is conventional and convenient but could be another reference index value. Refractive index delta $n_1$ is the index delta of the core at radius zero, typically the maximum index delta of the core. The index delta $n_{clad}$, of the cladding in the example shown is usually zero, i.e. the cladding is pure silica. However, it could be any suitable positive or negative value. Refractive index delta $n_s$ is the index delta where the core region ends and clad region begins such that delta $n_s=n_s-n_{clad}$, and in this example delta $n_s$ defines the step height in terms of refractive index.

For the purpose of describing the invention the core is considered to comprise or consist essentially of the alpha core region 31 and the step 35. This follows the normal convention of defining the core of an optical fiber as the center part of the optical fiber that is positively doped, for example, germanium doped. The alpha core region extends from the center of the optical fiber, where the refractive index is $n_1$, to the outer edge of the core at R1, where the index is $n_s$ and the delta refractive index steps from delta $n_s$ down to zero. The step may be defined as having a height delta $n_s$, and a width of nominally zero. According to embodiments of the present invention, the absolute value of delta $n_s$ may be expected to lie in the range about 0.001 to about 0.006. Since the absolute values of refractive index may vary considerably from one index profile to another it may be convenient to define the step in terms of the ratio $(n_s-n_{clad})/(n_1-n_{clad})$. A preferred ratio value for $(n_s-n_{clad})/(n_1-n_{clad})$ would fall within the range of about 0.02 to about 0.3.

Optical fiber refractive index profiles similar to the profile of FIG. 4 are described in U.S. patent application Ser. No. 12/658,804, filed Feb. 16, 2010, and U.S. Provisional Application No. 61/306,607 filed Feb. 22, 2010, again each hereby incorporated by reference in their entirety.

For the design of FIG. 4, the refractive index profile can be expressed generally as:

$$n(r) = \begin{cases} [n_1^2 - (n_1^2 - n_{clad}^2)(r/R2)^\alpha]^{1/2} & \text{where } r < R1 \\ n_{clad} & \text{where } r > R1 \end{cases}$$

In this expression $n_1$ is the refractive index at r=0, $n_{clad}$ is the refractive index of the cladding, and α is the power law profile parameter. R2 is the radius position where $n(R2)=n_{clad}$. It is theoretical fiber core size before the core is truncated.

R1 in the equation above can be determined by:

$$R1=R2*[(n_1^2-n_s^2)/(n_1^2-n_{clad}^2)]^{1/\alpha}$$

Where $n_s$ is the maximum refractive index of the core at the ledge (35 in FIG. 4) between core and cladding.

In these designs it is preferred, but not essential, that the value of refractive index differential $n_1-n_{clad}$ be less than 0.02. A preferred range for $n_1-n_{clad}$ is about 0.014 to about 0.02.

In these designs it is preferred, but not essential, that the value of R1 be in the range of about 22 microns to about 34 microns.

Figure 5:
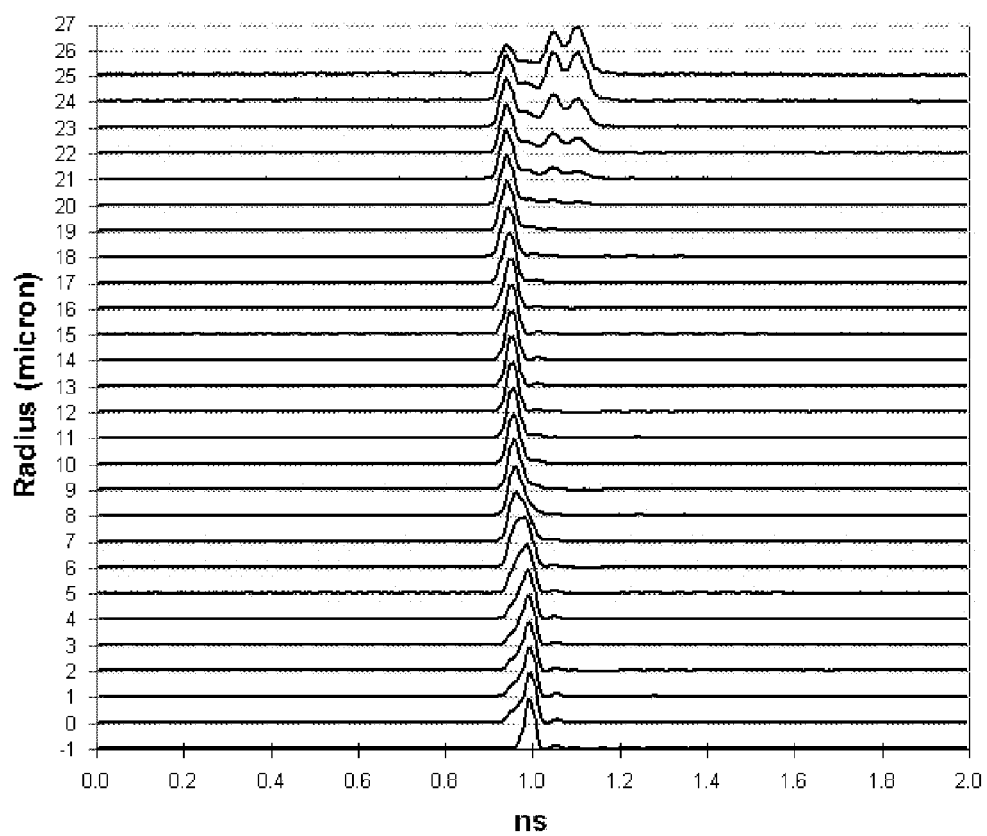
FIG. 5 is a Differential Mode Delay (DMD) trace for the optical fiber of FIG. 3 showing modal delay from 0~25 micron radius position.

The effect of the core edge step on the DMD of the optical fiber is shown in FIG. 5. The DMD in FIG. 5 is substantially improved over that of FIG. 3. However, the higher order modes still exhibit modal dispersion as evidenced by the distorted multiple pulses between radial positions 21 μm and 25 μm. The small DMD distortion as shown in FIG. 4 can be equalized by adjusting refractive index profile of graded index region.

Figure 6:
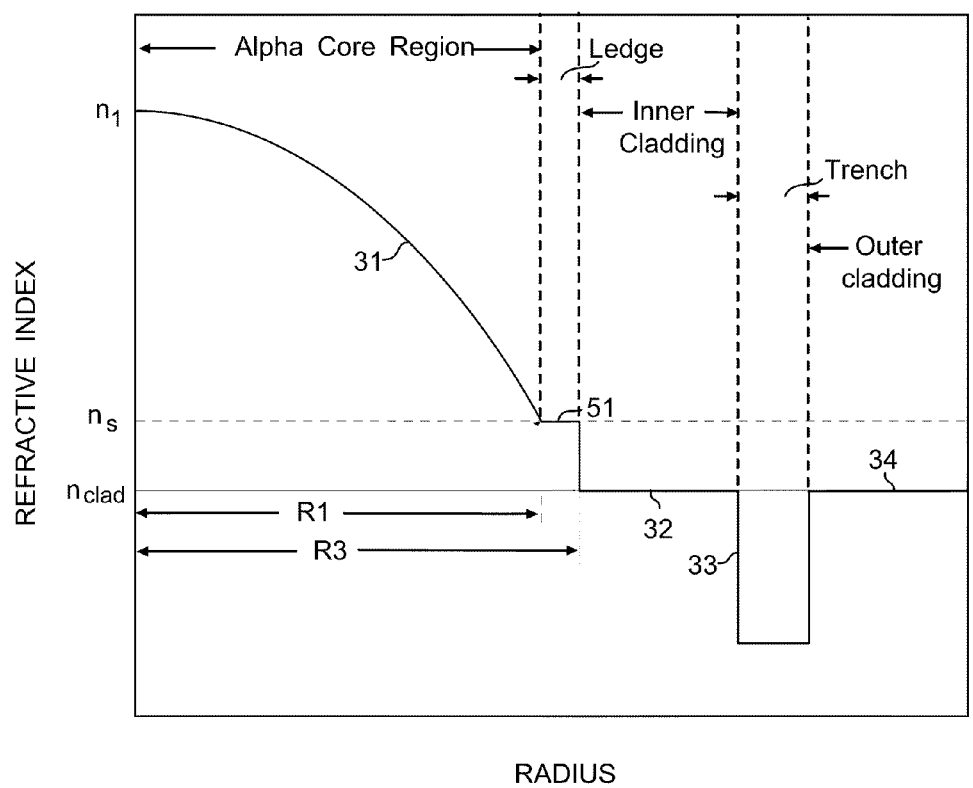
FIG. 6 shows a refractive index profile for an optical fiber having a truncated core modified by the addition of a ledge.

We have discovered that in the optical fibers with truncated core design, when the high order modes propagate slower than lower order modes as shown in FIG. 4, the DMD can be further improved by adding a ledge at the core edge step. This is shown in FIG. 6. The alpha portion of the refractive index profile is still designated 31, and radius R1 is the same as in FIG. 4. However, the step forming the truncated core edge, 35 in FIG. 4, is shifted away from the core center by distance R3−R1 to form ledge 51. In addition, the index of the ledge region is always less than or equal to the index at the end of the graded core region. It should be noted that in FIG. 6 the index of the ledge and the end of the graded core region are equal. Distance R3−R1 is preferably in the range of about 0.1 to about 3 microns. The inner cladding width 32 is preferably greater than 0.5 microns and preferably in the range 0.5 to 12 microns.

Figure 7:
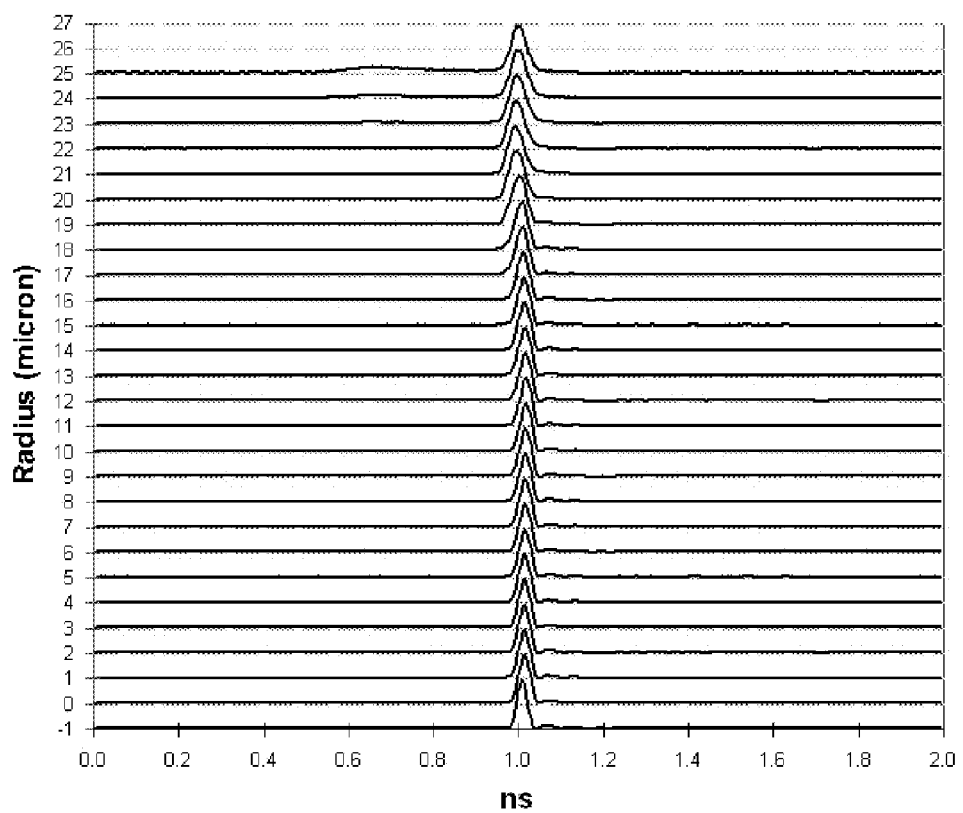
FIG. 7 is a DMD trace from 0~25 micron radius position for the optical fiber of FIG. 6.

The effect of the ledge on the DMD of the optical fiber of FIG. 6, where the index delta (ns−nclad) at the end of the graded core is 0.0017, is shown in FIG. 7. In this example the ledge width is chosen to be 0.3 microns and the ledge index is equal to the index at the end of the graded core region. The DMD in FIG. 7 is substantially improved over that of FIG. 5 and all of the modes in radial positions 0-25 um (the curve at radius position −1 um is a reference pulse) have equalized DMD.

The parameters of the trench are conventional. Typically a trench will have a width of at least 2 microns and a depth (negative refractive index delta) of at least 0.002. The outer cladding typically has a refractive index delta of zero (pure silica) as shown but may have other values and may have other features, for example, ring features.

The optical fiber designs described above are advantageously used in systems having Vertical Cavity Surface Emitting Lasers (VCSELs) as the optical source. Optical fibers of the invention coupled to VCSEL sources exhibit exceptional system performance.

In summary the optical fibers of the invention may be defined as having the sequential concentric regions extending from the center of the optical fiber as shown in FIG. 6. In terms of the refractive index profile shown these are:

Alpha Core Region—Region having an essentially alpha profile as defined above extending radially from the center of the optical fiber, having a refractive index delta $n_1$, to a distance R1.

Ledge—Region extending radially outward from R1 to radius R3, with refractive index delta $n_s$, where R3−R1 is preferably in the range 0.1 to 3 microns and wherein delta $n_s$ is preferably in the range of about 0.001 to 0.006.

Inner Cladding—Region extending radially from R3, with refractive index delta $n_{clad}$ for a distance greater than 0.5 microns and preferably 0.5 to 12 microns.

Trench—Region extending between inner cladding and outer cladding, typically with a refractive index delta ($n_{trench}-n_{clad}$) of less than −0.002 and a trench width greater than 2 microns.

Outer Cladding—Region extending radially outward from the trench region.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the following claims.

The invention claimed is:

1. A multi-mode optical fiber having a center and comprising the following sequential concentric regions extending radially outward from the center:
an alpha core region having an essentially alpha profile extending radially from the center of the optical fiber to a distance R1, with an index $n_1$ at the core center, the alpha core region has $n(r)=[n_1^2-(n_1^2-n_{clad}^2)(r/R2)^\alpha]^{1/2}$, where r is the radius of the fiber, $n_1$ is the refractive index at center of core, R2 is the radius of the core, $n_{clad}$ is the refractive index of the cladding, and α is a free parameter whose value is in the range 1.7 to 2.2;
an index step at R1 defined by a refractive index difference $n_s-n_{clad}$, wherein $n_s$ is the refractive index at R1 and $n_{clad}$ is the refractive index of an inner cladding region extending radially outward from R1 for a distance greater than 0.5 microns,
a trench region extending radially from inner cladding, and
an outer cladding region extending radially outward from the trench region.

2. The multi-mode optical fiber of claim 1 wherein an absolute value of ($n_s-n_{clad}$) is in the range of about 0.001 to about 0.003.

3. The multi-mode optical fiber of claim 2 where ($n_{clad}-n_{quartz}$) is approximately 0 where $n_{quartz}$ is the refractive index of pure silica.

4. The multi-mode optical fiber of claim 1 where a value of ($n_1-n_{clad}$) is within the range of about 0.005 to about 0.03.

5. The multi-mode optical fiber of claim 1 where ($n_1-n_{clad}$) is within the range of about 0.014 to about 0.02.

6. The multi-mode optical fiber of claim 1 where ratio ($n_s-n_{clad}$)/($n_1-n_{clad}$) is within the range of about 0.02 to about 0.2.

7. The multi-mode optical fiber of claim 1 where R1 is in the range of about 12 microns to about 34 microns.

8. The multi-mode optical fiber of claim 1 where the inner cladding region extends radially outward from R1 for a distance in the range of about 0.5 microns to about 12 microns.

9. The multi-mode optical fiber of claim 1 where the trench has a refractive index delta ($n_{trench}-n_{clad}$) less than −0.002 and a width greater than 2 microns.

10. The multi-mode optical fiber of claim 1 wherein the concentric regions are configured so that the modal delay of higher modes is equalized to that of the lower principle modes.

11. An optical fiber subsystem comprising the optical fiber of claim 1 coupled to a vertical cavity surface-emitting laser.

12. An optical system comprising:
a) a laser transmitter,
b) an optical receiver,
c) the multimode optical fiber of claim 1 coupled between the transmitter and receiver.

* * * * *